(12) United States Patent
Noordhuis et al.

(10) Patent No.: US 12,453,435 B2
(45) Date of Patent: Oct. 28, 2025

(54) DISPENSING MODULE FOR A BEVERAGE PREPARATION MACHINE

(71) Applicants: Koninklijke Douwe Egberts B.V., Utrecht (NL); Koninklijke Philips N.V., Eindhoven (NL)

(72) Inventors: Joeke Noordhuis, Groningen (NL); Johan Van Toor, Drachten (NL)

(73) Assignees: Koninklijke Douwe Egberts B.V., Utrecht (NL); Koninklijke Philips N.V., Eindhoven (NL)

( * ) Notice: Subject to any disclaimer, the term of this patent is extended or adjusted under 35 U.S.C. 154(b) by 1114 days.

(21) Appl. No.: 17/312,369

(22) PCT Filed: Dec. 10, 2019

(86) PCT No.: PCT/NL2019/050819
§ 371 (c)(1),
(2) Date: Jun. 9, 2021

(87) PCT Pub. No.: WO2020/122713
PCT Pub. Date: Jun. 18, 2020

(65) Prior Publication Data
US 2022/0015570 A1    Jan. 20, 2022

(30) Foreign Application Priority Data
Dec. 10, 2018  (NL) ..................... 2022165

(51) Int. Cl.
*A47J 31/40*    (2006.01)
*A47J 31/06*    (2006.01)
(Continued)

(52) U.S. Cl.
CPC ......... *A47J 31/407* (2013.01); *A47J 31/0673* (2013.01); *A47J 31/34* (2013.01); *A47J 31/467* (2013.01)

(58) Field of Classification Search
CPC ...... A47J 31/407; A47J 31/0673; A47J 31/34; A47J 31/467
See application file for complete search history.

(56) References Cited

U.S. PATENT DOCUMENTS 7,798,055 B2    9/2010  Mandralis
8,039,029 B2    10/2011 Ozanne
(Continued)

FOREIGN PATENT DOCUMENTS

CN    1889874    1/2007
CN    101516744  8/2009
(Continued)

OTHER PUBLICATIONS

International Search Report mailed Mar. 11, 2020, Internationial Application No. PCT/NL2019/050819 (6 pgs.).

*Primary Examiner* — Steven W Crabb
*Assistant Examiner* — Fahmida Ferdousi
(74) *Attorney, Agent, or Firm* — Fitch, Even, Tabin & Flannery LLP

(57) ABSTRACT

Dispensing module for a beverage preparation machine For providing a beverage with a proper consistency using a capsule-based brewing system wherein hot liquid is injected into the capsule under pressure, which capsule is placed against a brewing plate (210) with protrusion (212) arranged to cut the capsule cover under pressure, it has been found that a free flow of the prepared beverage can flow gradually from the brewing plate (210) towards an outlet nozzle (126). An open passage (206) from the brewing plate (210) via a collector chamber (204) downstream of the brewing plate, to the outlet nozzle (126) may be provided with an open and slanted gutter (222) to lead the beverage out of the collector chamber (204) to provide the best results. Due to the open nature of the conduit, jets of beverage form the brewing plate may the open gutter and soil the machine. This may be (Continued)

prevented by providing appropriate shielding (250) between the brewing plate and the gutter or an opening thereof.

23 Claims, 2 Drawing Sheets

(51) Int. Cl.
    *A47J 31/34*     (2006.01)
    *A47J 31/46*     (2006.01)

(56) References Cited

U.S. PATENT DOCUMENTS

| | | | |
|---|---|---|---|
| 10,485,376 B2 | 11/2019 | Van Den Aker | |
| 2009/0178571 A1* | 7/2009 | Brouwer | A47J 31/467 99/302 R |
| 2011/0011271 A1 | 1/2011 | Kollep | |
| 2011/0274794 A1 | 11/2011 | Gerbaulet | |
| 2013/0001251 A1* | 1/2013 | Mori | A47J 31/3633 99/295 |
| 2013/0247775 A1* | 9/2013 | Mori | A47J 31/407 99/295 |
| 2014/0130680 A1 | 5/2014 | Fin | |
| 2016/0166105 A1 | 6/2016 | Bugnano | |
| 2017/0367524 A1 | 12/2017 | De Graaff | |

FOREIGN PATENT DOCUMENTS

| | | | | |
|---|---|---|---|---|
| CN | 105813513 | 7/2016 | | |
| CN | 105813519 | 7/2016 | | |
| CN | 107205578 | 9/2017 | | |
| EP | 0727164 | 8/1996 | | |
| EP | 727164 A1 * | 8/1996 | | A47J 31/0663 |
| EP | 1247480 | 10/2002 | | |
| EP | 1659547 A1 * | 5/2006 | | A47J 31/3633 |
| GB | 2569619 | 6/2019 | | |
| JP | 2005230548 | 9/2005 | | |
| RU | 2331349 | 8/2008 | | |
| WO | 2005053486 | 6/2005 | | |

* cited by examiner

DISPENSING MODULE FOR A BEVERAGE PREPARATION MACHINE

CROSS REFERENCE TO RELATED APPLICATIONS

This application is a U.S. national phase application of International Application No. PCT/NL2019/050819, filed Dec. 10, 2019, which claims benefit from the Netherlands Application 2022165, filed Dec. 10, 2018, which are each hereby incorporated herein by reference in their entirety.

TECHNICAL FIELD

The various aspects and embodiments thereof relate to a machine for preparing beverages by extracting matter from a substance contained in a capsule by passing hot liquid through the capsule and more in particular to a collector module for such machine, which collector module is arranged for collecting beverage and providing a track for beverage towards a dispensing nozzle.

BACKGROUND

WO 2009/043630 discloses a beverage machine with a beverage brewing unit for receiving a single-serve capsule comprising a capsule holding assembly for holding a capsule in a position. During brewing, water is injected by a high pressure pump in the capsule. A pressure in the capsule is established that leads to the puncturing of the membrane against the puncture plate. Once the capsule is pierced, beverage can be released from the capsule through the perforation, through the puncture plate. The beverage is collected and drained via a collecting duct leading into an outlet duct. Between the collecting duct and the outlet, a horizontal fluid track is provided by a tubular member.

US 2013/0001251 discloses a beverage machine comprising a casing enclosing a first part of receiving an ingredient capsule therein, a second part having, in use, a vertical surface provided with perforating projecting members facing the first part and an opening in the casing enabling the capsule to be inserted. In use, fluid contained in the capsule (e.g. coffee) flows out of the capsule and is permitted to pass through beverage evacuation orifices that open out in a receiving chamber. Fluid flows from the receiving chamber through an exit nozzle in open connection with the chamber and in line with the capsule and beverage evacuation orifices in the first part. Through the exit nozzle, the beverage pours down into a cup.

SUMMARY

It is preferred to provide a collecting module that provide a beverage having an improved consistency and in particular a beverage with a foam having an improved consistency.

A first aspect provides a dispensing module for a beverage preparation machine arranged to brew a beverage by extracting matter from a substance by passing hot liquid under pressure through the substance. The substance may be held in a capsule. The module may comprise a fluid receiving plate comprising a plurality of openings distributed over at least part of the plate, the openings being arranged for receiving the beverage. The fluid receiving plate may comprise a plurality of extension arranged to tear the capsule, e.g. a tearable portion thereof, such as a cover. The module may further comprise a fluid collector being delimited by the fluid receiving plate at a first side of the collector and a collector wall at a second side of the collector. The fluid collector may be arranged for receiving beverage from the openings, wherein the fluid collector is provided with a collector outlet opening in the collector wall. The module may further comprise an outlet conduit extending from the collector outlet opening, for receiving fluid via the collector outlet opening and for guiding, in use, fluid towards at least one dispensing nozzle of the beverage preparation machine. The module may further comprise a deflector wall provided between the fluid receiving plate and the collector outlet opening for screening off direct impingement of fluid from the fluid receiving plate into the outlet conduit.

Firstly, by providing the outlet conduit, a continuous flow of beverage is provided, in particular for lastly brewed beverage that is to be guided with a flow despite absence of pressure after the end of the brewing process. Secondly, by blocking a possible direct jet of beverage from an opening of the fluid receiving plate from entering the outlet conduit and possibly leaving the outlet conduit into the machine as a jet and thereby not flowing toward the at least one outlet nozzle of the machine but instead possibly pollute an interior of the machine.

With these measures, a gradual flow of beverage is provided, with a reduced risk of droplets or jets of the beverage entering other parts of the machine, reducing risk of soiling and potential malfunctioning of the other parts as a result thereof.

In an embodiment, the deflector wall is positioned such that a line which extends perpendicular to the fluid receiving plate and which extends through an opening of the fluid receiving plate and at least a portion of a space laying within the outlet conduit also extends though the deflector wall.

With the fluid receiving plate having the openings established by bores perpendicular to the orientation of the array of openings and perpendicular to a main plane of the fluid receiving plate, jets of beverage provided through the opening by virtue of hot liquid being injected under pressure in the capsule exit the openings almost or substantially perpendicular relative to the main plain of the fluid receiving plate. With the deflector wall positioned on a line perpendicular to the fluid receiving plane extending through an opening and the gutter, jetting of beverage from the fluid receiving plate directly in the gutter is prevented. In this way, a factor disturbing a gradual flow of beverage or a factor otherwise detrimental to conservation or formation of foam on the beverage is eliminated or at least reduced.

In another embodiment, the deflector wall comprises an area at least as large as the collector outlet opening.

With such size of the deflector wall, the deflector wall is sufficiently large to shield the whole of the collector outlet opening or at least a very large part thereof from any direct jets entering the collector outlet opening an potentially the outlet conduit.

In again another embodiment, the outlet conduit comprising a gutter, wherein at least part of the gutter is, in use, slanted downward. In such embodiment, the beverage is enabled to flow smoothly and gradually, even when little or no coffee is left anymore in the fluid collector.

In a further embodiment, the outlet conduit comprises a plurality of subsequent gutter segments and the slope of the gutter segments increases at further distance from the plurality of openings.

With this embodiment, speed of the flow of beverage is gradually increased, without any or at least without too much disturbance of the flow.

In yet another embodiment the deflector wall extends substantially parallel to the fluid receiving plate.

With the deflector wall being parallel to the fluid receiving plate, a compact dispensing module may be provided, by keeping the fluid collector small. Furthermore, any jets from the openings in the fluid receiving plate are stopped such that they do not have any remaining velocity anymore after impact. This, in turn, means less influence on a further downstream gradual flow of beverage.

In again another embodiment, the collector wall extends substantially parallel to the fluid receiving plate.

This embodiment is particularly advantageous if the deflector wall is provided such that not all jets originating from the fluid receiving plate directly impinge on the deflector wall; such jets impinge on the collector wall with an impact such that they have no further velocity after impact. Second, such embodiment allows for a compact implementation of the fluid collector.

In a further embodiment, at least one of the fluid receiving plate, deflector plate and collector wall has an upstanding, vertically oriented orientation.

In again a further embodiment, at least one of the fluid receiving plate and the deflector wall is provided with spacers distributed along the periphery of the at least one of the fluid receiving plate and the deflector wall arranged for establishing a space between the fluid receiving plate and the deflector wall.

The spacers ensure room is provided between the deflector wall and the fluid receiving plate that may be sufficient for beverage provided by jets from the openings and impacted on the deflector wall to flow further into the fluid collector in a gradual way.

In yet a further embodiment, a bottom spacer is provided at the bottom of at least one of the deflector wall and the fluid receiving plate, the bottom spacer having a width equal to or larger than a width of the collector outlet.

With this embodiment, a flow directly downward from the deflector wall into the fluid collector and subsequently directly into the collector outlet opening is prevented or at least highly reduced. The beverage will firstly flow sideways into the fluid collector and subsequently to the collector outlet opening, for example via further walls of the fluid collector.

In again a further embodiment, the openings in the fluid receiving plate have a directional outlet and at least part of the deflector wall is provided in a flow path between the collector outlet and openings of which the outlet is directed towards the collector outlet.

A directional outlet is an outlet that provides a jet of beverage in a particular direction, determined by the shape of the outlet. Hence, the flow path is determined by the shape of the directional outlet.

In another embodiment, the deflector wall is curved with a concave side of the deflector wall facing the fluid receiving plate.

With this embodiment, jets of beverage do not impact perpendicularly on the deflector wall, but under an angle. Such impact is less disturbing to the beverage and any foam that may be presented.

In again another embodiment, the fluid collector is connected to the outlet conduit and integrally formed with the outlet conduit.

Such dispensing module is more efficient to manufacture.

Yet a further embodiment comprises a circumferential wall connecting the plate to the collector wall, thus forming a collector chamber.

By providing chamber, any influence from outside the chamber to the beverage is reduced.

In yet another embodiment, the collector chamber is provided with a through hole at or near the top of the chamber.

Any gas or fluid comprising atomised liquid droplets, optionally under pressure, may leave the collector chamber, thus reducing any influence on the prepared beverage.

A second aspect provides a machine for preparing a beverage from a hot liquid and a substance. The machine comprises a brewing chamber for receiving the capsule, a hot liquid source and a hot liquid conduit for providing the hot liquid to the brewing chamber. The machine further comprises the dispensing module according to any of the preceding claims, wherein the plate delimits the brewing chamber; and a beverage disposal in fluid communication with the outlet conduit.

In an embodiment of the second aspect, the dispensing module is provided slidably in the machine between a first position and a second position. Such machine allows for use with capsules in various sizes, while maintaining advantages discussed above. In this embodiment, the deflector wall—as comprised by the dispensing module—preferably has a fixed position relative to the fluid receiving plate—as comprised by the dispensing module as well—, which means that the functionality of the deflector wall relative to the fluid receiving plate is constant independent from the position of the dispensing module in the machine. This independent functionality assures consistent quality of the beverage, irrespective of the size of the capsule used.

In another embodiment of the second aspect, the machine further comprises a biasing member for biasing the dispensing module towards the brewing chamber. This embodiment allows for improved sealing of the brewing chamber, irrespective of the size of the capsule.

In a further embodiment, the beverage disposal comprises a second fluid channel provided such that it is arranged to receive beverage from the outlet conduit if the dispensing module is in the first position as well as in the second position. In this embodiment, the second fluid channel may be provided in a fixed position relative to the machine and the outlet conduit in a slidable way. This allows for more convenient construction as well as use.

BRIEF DESCRIPTION OF THE DRAWINGS

The various aspects and embodiments thereof will now be discussed in further detail in conjunction with drawings. In the drawings.

DETAILED DESCRIPTION

Figure 1:
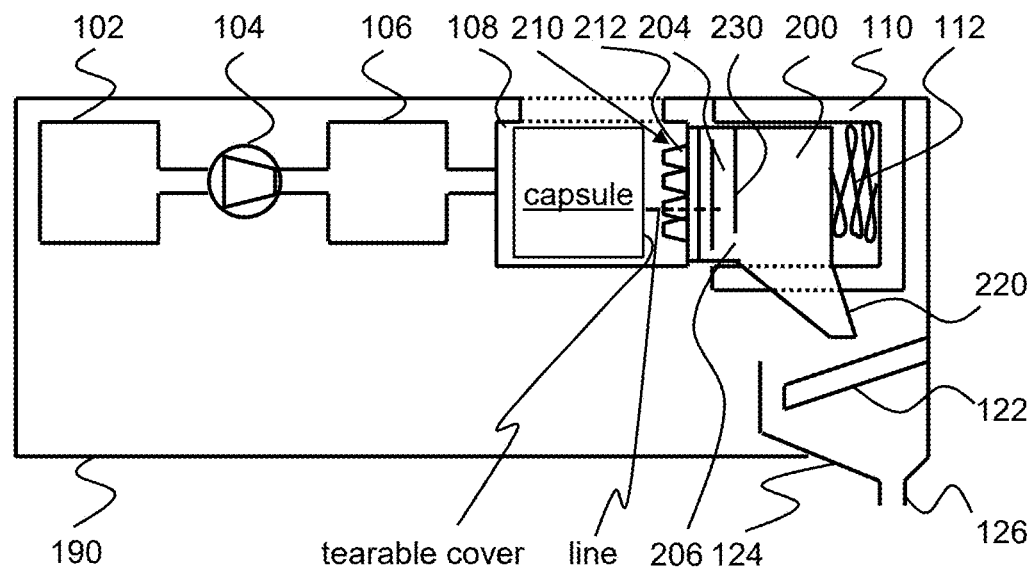
FIG. 1: shows a schematic view of a coffee machine.

FIG. 1 shows a coffee machine 100 as an embodiment of the machine for preparing a beverage according to the second aspect. The coffee machine 100 comprises a housing 190 in which the various functional parts of the coffee machine 100 are provided. The coffee machine 100 comprises a liquid reservoir 102 for holding water or another liquid for preparing the coffee, a pump 104 for pumping the water to a heater element 106 for heating the water.

The heated water is injected in a capsule with ground coffee (not shown) that is inserted in a brewing chamber 108. For this the capsule may be pierced open by the apparatus on an inlet side of the capsule. During brewing, the capsule is pressed against a fluid receiving plate also referred to as a stud plate 210 as a fluid receiving plate, sometimes in the art also referred to as extraction plate, comprising studs 212 and through holes between the studs 212 as a fluid receiving plate. The stud plate is arranged on a side which faces, in use, the capsule for opening the capsule under the influence of fluid pressure. More specifically by virtue of the pressure of the provided hot water which enters into the capsule under pressure, a cover of the capsule, preferably provided in metal, like aluminium, or in plastic, is provided as an option for a tearable portion of the capsule that may be torn open by a plurality so called studs 212 provided as a plurality of extensions on the stud plate 210, allowing brewed coffee to flow out of the capsule and through the holes in the stud plate 210.

Behind the stud plate 210, a fluid collector is provided, comprising a collector chamber 204 for receiving the brewed coffee provided by the holes in the stud plate 210. In the collector chamber 204, in a rear wall 230 as an upstanding collector wall opposite to the stud plate 210, an opening 206 is provided giving access to a first fluid channel 220 provided as an outlet conduit for guiding brewed coffee away from the collector chamber 204 in a direction away from the stud plate 210.

In this embodiment, the collector chamber 204 is delimited by the stud plate 210 at a first side and by the rear wall 230 at a second side, opposite to the first side. Whereas in this embodiment, the stud plate 210 and the rear wall 230 are provided parallel to one another, the rear wall 230 be shaped or oriented differently relative to the stud plate 210. The stud plate 210 and the rear wall 230 are in this embodiment connected by a circumferential wall. The collector chamber 204, with the stud plate 210, the rear wall 230, the circumferential wall and the first fluid channel 220 are comprised by a collector module 200.

The collector module 200 is slidably provided in a collector housing member 110, between a first positon and second position. Within the collector housing member 110, the collector module 200 is biased towards the brewing chamber 108 by means of a spring 112 as a biasing member.

Downstream of the first fluid channel 220, a second fluid channel 122 is provided as a part of a fluid track for providing coffee to a dispensing nozzle 126. The coffee provided by the first fluid channel 220 flows via the slanted second fluid channel 122 in a nozzle collector 124 to which the dispensing nozzle 126 is connected.

Figure 2:
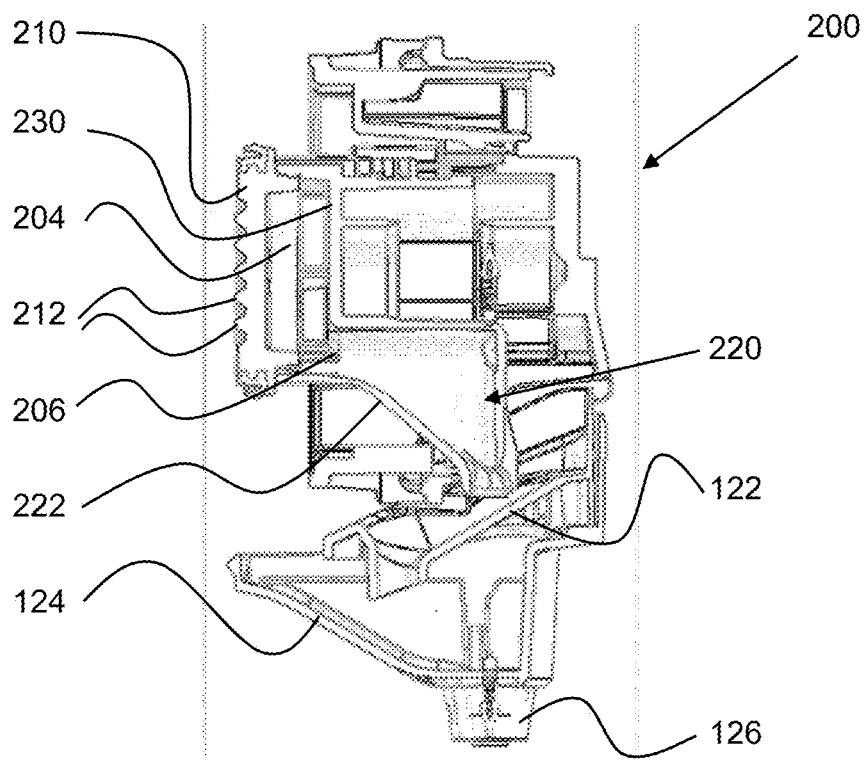
FIG. 2: shows a cross-section of a collector module.

FIG. 2 shows a more detailed view of the collector module 200. FIG. 2 shows the stud plate 210 with the studs 212 provided thereon at an upstream side of the collector chamber 204. At the downstream side of the collector chamber 204, the rear wall 230 is provided for receiving coffee from the holes in the stud plate 210. In case coffee is provided under high pressure, nearly or substantially horizontal jets of coffee may be provided through the openings in the stud plate 210, which jets impinge on the rear wall 230. The rear wall 230 is in this embodiment depicted as being substantially parallel to the stud plate 210 and other embodiments may be envisaged in which the rear wall 230 is provided under an angle relative to the stud plate 210 and/or wherein the rear wall 230 is curved or otherwise shaped.

At a lower side of the rear wall 230 and at the bottom of the rear wall 230 in particular, an outlet opening 206 is provided to enable coffee to flow out of the collector chamber 204. From the outlet opening 206, a gutter 222 extends as the first fluid channel 220. The gutter 222 is slanted downward for directing coffee to the second fluid channel 122. As discussed above, the collector module 200 with the first fluid channel 220 is arranged to be translated in the collector housing member 110. Hence, the first fluid channel 220 is movable relative to the second fluid channel 122.

Figure 3:
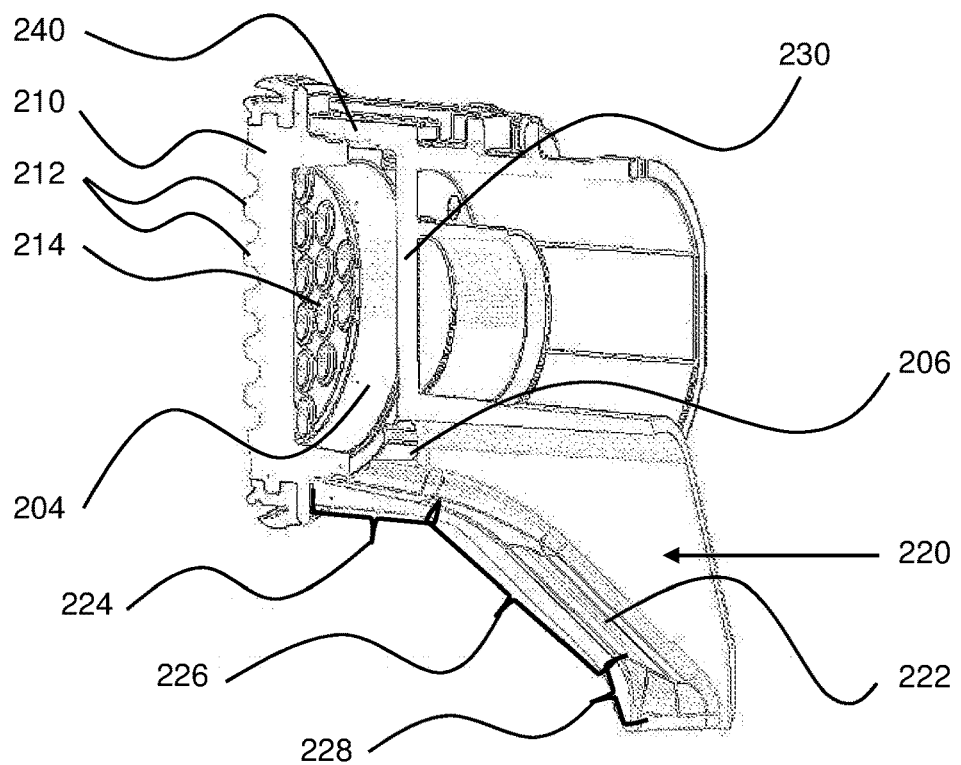
FIG. 3: shows an isometric view of a section of the collector module viewed from a downstream side.

FIG. 3 shows an isometric view of the collector module 200. FIG. 3 shows that the first fluid channel is affixed to an in particular provided as an integral part with the first fluid channel 220. Within the first fluid channel, the gutter 222 is provided as an open channel comprising multiple gutter segments having an increasing slanting angle as the gutter segments are located further away from the stud plate 210.

A first gutter segment 224 is nearly horizontal, as second gutter segment 226 is slanted over an angle between fifty and forty degrees, at about forty-five degrees and a third gutter segment 228 has an inclination of seventy or eighty degrees—almost vertical. It is noted that the inclination provided here are merely provided as an illustrative example and may be implemented using different values, either lower or higher.

In another embodiment, the gutter 222 has only one gutter segment, inclining over one particular angle, preferably between forty and fifty degrees. It is noted the gutter 222 is open at the top. FIG. 3 shows a part of an arch provided above the gutter 222, yet the gutter 222 is provided as a channel being open at the top, rather than being confined at the top like a tube, a hose or a pipe.

FIG. 3 also shows a plurality of openings 214 in the stud plate 210. The openings 214 are provided in a two-dimensional array and are provided as through-holes, extending from the upstream side of the stud plate 210 to the downstream side of the stud plate 210. FIG. 3 shows that the collector chamber 204 is at the upstream side delimited by the stud plate 210 and at the downstream side delimited by the rear wall 230.

The stud plate 210 and the rear wall 230 are connected by a circumferential wall 240 that surrounds the collection chamber 204 and provided the collection chamber 204 with a substantially cylindrical shape. In this embodiment, the first gutter element 224 is provided in the circumferential wall 240, which first gutter element 224 extends through the outlet opening 206 in the rear wall. In another embodiment, the circumferential wall 240 is flush in the collection chamber 204 and the gutter 222 starts downstream of the outlet opening 206.

In one embodiment, the circumferential wall 240 comprises, preferably at the top, a through hole. Such through hole provides a passage for any steam of other gaseous matter or atomised liquid to escape, without disturbing a flow of coffee through the first fluid channel.

FIG. 3 shows that the circumferential wall 240, the first fluid channel 220 comprising the gutter 222 and the rear wall 230 are provided as one integral part. The stud plate 210 is provided as a separate unit, which allows the stud plate to be manufactured from a material different from that of the rest of the collector module 200.

Figure 4:
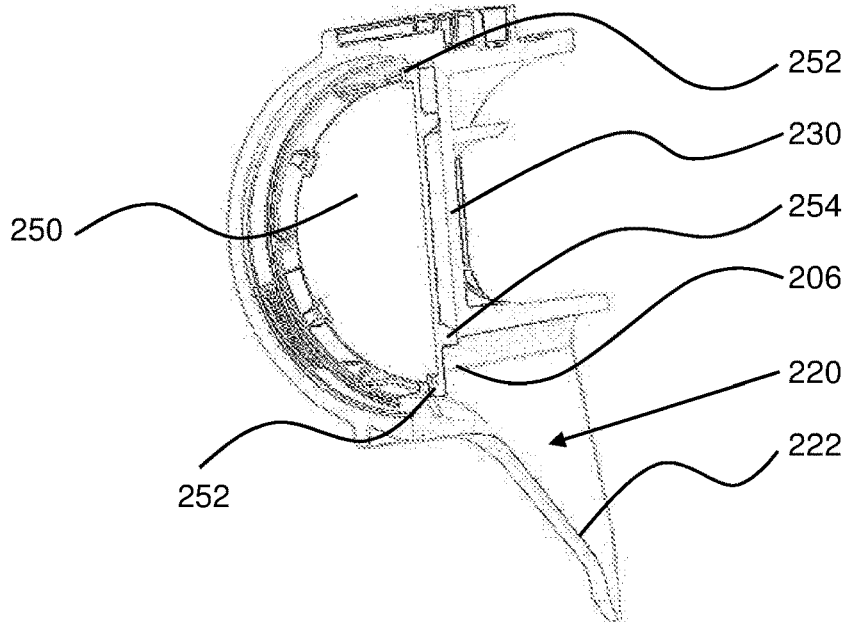
FIG. 4: shows an isometric view of a section of the collector module viewed from an upstream side.

FIG. 4 shows an isometric view of the collector module 200 from the upstream side of the collector module 200, with the stud plate 210 removed. In the collector module 200, a deflector wall 250, hereinafter also referred to as deflector plate 250 is provided. The deflector plate 250 provides a screen between openings 214 in the stud plate 210 and the outlet opening 206 towards the first fluid channel 220. In this way, the deflector plate 250 prevent jetting of any coffee directly from one of the openings 214 through the outlet opening 206 in the first fluid channel 220.

The deflector plate 250 is provided downstream of the stud plate 210, at a distance from the stud plate 210. The distance between the deflector plate 250 and the stud plate 210 may be determined by spacers 252 that are provided on the deflector plate 250 at the side that faces the fluid receiving plate 210. Additionally or alternatively, backside spacers 254 may be provided on the downstream side of the stud plate 210 for defining a distance between the deflector plate 250 and the rear wall 230. In a further embodiment, a spacer is provided at a lower end and in particular at the bottom of the deflector plate 250, which spacer is at least as wide as the outlet opening 206.

The spacers 252 or the backside spacers 254 also provide a gap between the deflector plate 250 and the circumferential wall 240 to enable coffee to pass between the circumferential wall 240 and the deflector plate 250. The gap is provided over at least 50% of the circumference of the deflector plate and preferably for more than 80% of the deflector plate, more preferably over more than 90% of the deflector plate, more preferably over more than 95% of the deflector plate. In a most preferred embodiment, the gap is provided around 100% of the deflector plate 250, optionally with the exception of any potentially available spacers between the deflector plate 250 and the circumferential wall 240.

In the embodiment shown by FIG. 4, the deflector plate 250 is provided as a flat plate, with an area substantially equal to or larger than the array of openings 214. The deflector plate 250 may be larger or smaller, as long as coffee impinging on the deflector plate 250 may flow between the deflector plate 250 and the stud plate 210 in the collector chamber 204 and towards the outlet opening 206. In another embodiment, the deflector plate 250 is smaller and is provided in a flow trajectory of jets originating from openings 214 in the stud plate 210 and traveling towards the outlet opening. In this embodiment, at least some jets originating from the openings 214 having a flow trajectory not traversing the outlet opening 206 may impinge on the rear wall 203 at the back of the collector chamber 204.

The deflector plate 250 is in the embodiment shown by FIG. 4 shown as substantially parallel to the rear wall 230. In other embodiments, the deflector plate 250 may, irrespective of its size, have a curved shaped, with preferably a concave side of the deflector plate 250 directed towards the stud plate 210. In such embodiment, the deflector plate 250 may curved such that the deflector plate 250 is at the top closer to the stud plate 210 than at the bottom of the deflector plate. Additionally or alternatively, the centre of the deflector plate 250 may be further off from the stud plate 210 than edges of the deflector plate 250 at substantially the same height at the centre of the deflector plate 250—or the other way around.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

For providing a beverage with a proper consistency using a capsule-based brewing system wherein hot liquid is injected into the capsule under pressure, which capsule is placed against a brewing plate with protrusion arranged to cut the capsule cover under pressure, it has been found that a free flow of the prepared beverage can flow gradually from the brewing plate towards an outlet nozzle. An open passage from the brewing plate via a collector chamber downstream of the brewing plate, to the outlet nozzle may be provided with an open and slanted gutter to lead the beverage out of the collector chamber to provide the best results. Due to the open nature of the conduit, jets of beverage form the brewing plate may the open gutter and soil the machine. This may be prevented by providing appropriate shielding between the brewing plate and the gutter or an opening thereof.

The various embodiments have been shown with a vertically oriented stud plate, an upstanding or vertically oriented collector wall and a vertically oriented deflector plate. In other embodiments, the stud plate may be oriented in different positions, including horizontally or under an angle. The detailed description discloses the coffee—or other substance—to be contained in a cup. In other examples, the substance is not contained in a separate capsule, but provided in the brewing chamber 108 as such, for example like ground coffee as a powder.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. Beverage preparation machine arranged to brew a beverage by extracting matter from a substance by passing hot liquid under pressure through the substance held in a capsule having a tearable cover, the beverage preparation machine comprising:
    a brewing chamber for receiving the capsule;
    a hot liquid source;
    a hot liquid conduit for providing the hot liquid to the brewing chamber;
    a dispensing module comprising: —a fluid receiving plate comprising a plurality of extensions arranged to tear the tearable cover of the capsule, and a plurality of openings distributed over at least part of the plate, the openings being arranged for receiving the beverage, wherein the plate delimits the brewing chamber;
    a fluid collector being delimited by the fluid receiving plate at a first side of the collector and a collector wall at a second side of the collector, the fluid collector being arranged for receiving beverage from the openings, wherein the fluid collector is provided with a collector outlet opening;

an outlet conduit extending from the collector outlet opening, for receiving fluid via the collector outlet opening and for guiding, in use, fluid towards at least one dispensing nozzle of the beverage preparation machine; and a deflector wall provided between the fluid receiving plate and the collector outlet opening for screening off direct impingement of fluid from the fluid receiving plate into the outlet conduit wherein at least one of the fluid receiving plate, deflector wall and collector wall has an upstanding, vertically oriented orientation.

2. Beverage preparation machine according to claim 1, wherein the deflector wall is positioned such that a line which extends perpendicular to the fluid receiving plate and which line extends through an opening of the fluid receiving plate and at least a portion of a space laying within the outlet conduit also extends though the deflector wall.

3. Beverage preparation machine according to claim 1, wherein the deflector wall comprises an area at least as large as the collector outlet opening.

4. Beverage preparation machine according to claim 1, wherein the outlet conduit comprising a gutter, wherein at least part of the gutter is, in use, slanted downward.

5. Beverage preparation machine according to claim 1, wherein the outlet conduit comprises a plurality of subsequent gutter segments and the slope of the gutter segments increases at further distance from the plurality of openings.

6. Beverage preparation machine according to claim 5, wherein the outlet conduit is curved.

7. Beverage preparation machine according to claim 1 wherein the deflector wall extends parallel to the fluid receiving plate.

8. Beverage preparation machine according to claim 1, wherein the collector outlet opening is provided near a lower side of the collector.

9. Beverage preparation machine according to claim 1 wherein the collector wall extends parallel to the fluid receiving plate.

10. Beverage preparation machine according to claim 1, wherein at least one of the fluid receiving plate and the deflector wall is provided with spacers distributed along the periphery of the at least one of the fluid receiving plate and the deflector wall arranged for establishing a space between the fluid receiving plate and the deflector wall.

11. Beverage preparation machine according to claim 10, wherein a bottom spacer is provided at the bottom of at least one of the deflector wall and the fluid receiving plate, the bottom spacer having a width equal to or larger than a width of the collector outlet opening.

12. Beverage preparation machine according to claim 1, wherein the openings in the fluid receiving plate have a directional outlet and at least part of the deflector wall is provided in a flow path between the collector outlet opening and openings of which the outlet is directed towards the collector outlet opening.

13. Beverage preparation machine according to claim 1, wherein the area of the deflector wall is equal to or larger than the plurality of openings.

14. Beverage preparation machine according to claim 1, wherein the deflector wall is curved with a concave side of the deflector wall facing the fluid receiving plate.

15. Beverage preparation machine according to claim 1, wherein the fluid collector is connected to the outlet conduit.

16. Beverage preparation machine according to claim 15, wherein the fluid collector is integrally formed with the outlet conduit.

17. Beverage preparation machine according to claim 1, wherein the collector further comprising a circumferential wall connecting the fluid receiving plate to the collector wall, thus forming a collector chamber.

18. Beverage preparation machine according to claim 17, wherein the collector chamber is provided with a through hole at or near the top of the chamber.

19. Beverage preparation machine according to claim 17, wherein at least one gap is provided between the circumference of the deflector wall and the circumferential wall, extending along at least 50% of the circumference of the deflector wall.

20. Beverage preparation machine according to claim 1, wherein the fluid receiving plate is arranged on a side which faces, in use, the capsule for opening the capsule under the influence of fluid pressure.

21. Beverage preparation machine according to claim 1, wherein the dispensing module is provided slidably in the beverage preparation machine between a first position and a second position.

22. Beverage preparation machine according to claim 21 wherein the beverage preparation machine further comprises a biasing member for biasing the dispensing module towards the brewing chamber.

23. Beverage preparation machine according to claim 21, wherein the beverage disposal comprises a second fluid channel provided such that it is arranged to receive beverage from the outlet conduit if the dispensing module is in the first position as well as in the second position.

* * * * *